No. 737,548. PATENTED AUG. 25, 1903.
J. K. ZEININGER.
BAKING PAN.
APPLICATION FILED JULY 31, 1902.
NO MODEL.
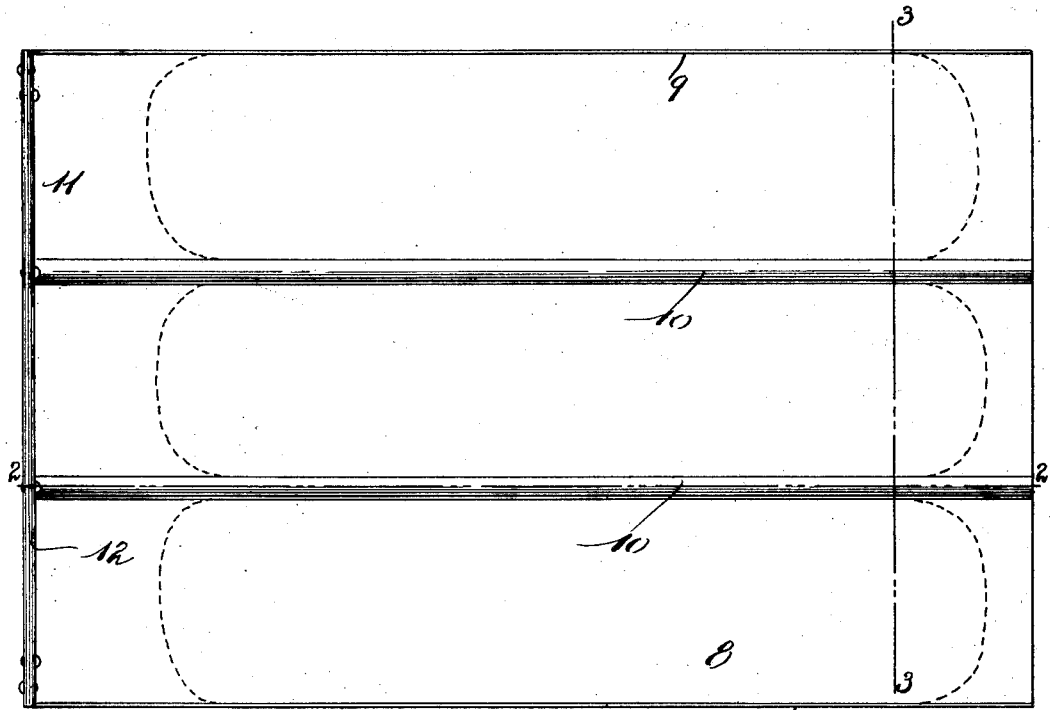
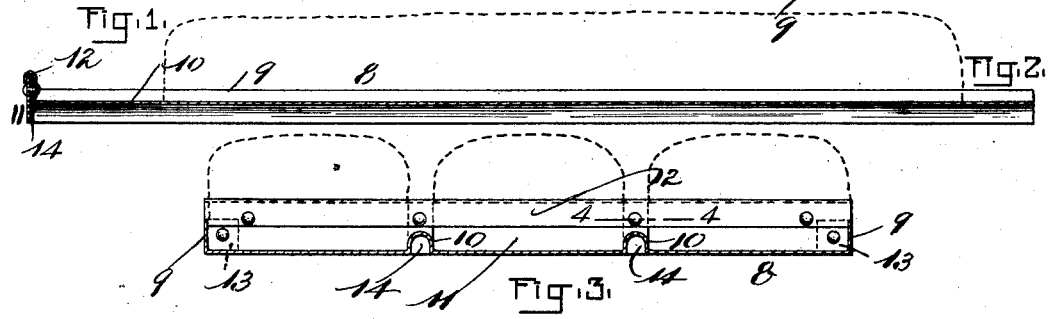
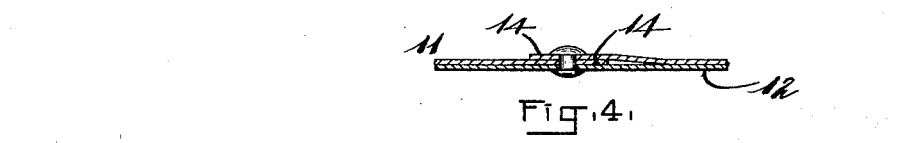
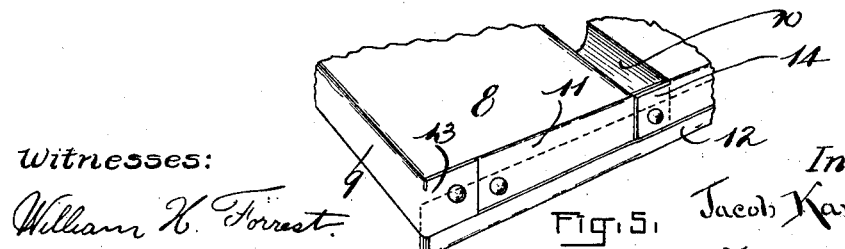
Witnesses:
William H. Forrest.
Louis A. Jones.
Inventor:
Jacob Karl Zeininger,
by his Attorney,
Charles V. Gooding.
THE NORRIS PETERS CO., PHOTO-LITHO., WASHINGTON, D. C.

No. 737,548. Patented August 25, 1903.

UNITED STATES PATENT OFFICE.

JACOB KARL ZEININGER, OF SOMERVILLE, MASSACHUSETTS, ASSIGNOR TO THE KARL DIGESTIBLE RUSK COMPANY, OF KITTERY, MAINE, A CORPORATION OF MAINE.

BAKING-PAN.

SPECIFICATION forming part of Letters Patent No. 737,548, dated August 25, 1903.

Application filed July 31, 1902. Serial No. 117,802. (No model.)

*To all whom it may concern:*

Be it known that I, JACOB KARL ZEININGER, a subject of the Emperor of Germany, residing at Somerville, in the county of Middlesex and State of Massachusetts, have invented new and useful Improvements in Baking-Pans, of which the following is a specification.

This invention relates to pans for baking bread and the like, the object of the invention being to provide a baking-pan in which a number of loaves of bread may be baked at the same time without coming into contact with each other.

The object of the invention is, further, to provide a baking-pan from which said loaves of bread may be easily removed and in which said loaves are exposed to an evenly-heated surface when being baked.

The invention consists in the combination and arrangement of parts set forth in the following specification and particularly pointed out in the claim thereof.

Referring to the drawings, Figure 1 is a plan view of my improved baking-pan. Fig. 2 is a longitudinal section taken on line 2 2 of Fig. 1. Fig. 3 is a transverse section taken on line 3 3 of Fig. 1 looking toward the left in said figure. Fig. 4 is a detail section taken on line 4 4 of Fig. 3. Fig. 5 is an underneath perspective view of a portion of my improved baking-pan.

Like numerals refer to like parts throughout the several views of the drawings.

In the drawings, 8 is a sheet of metal, a portion of the same being turned up longitudinally at each side thereof to form flanges 9 9, which extend the full length of the baking-pan. Convex separating-partitions 10 10 extend lengthwise of the baking-pan parallel to the side flanges 9 9, said convex separating-partitions being formed integral with the sheet of metal 8, forming said baking-pan. At one end of the baking-pan a transverse flange 11 is formed by turning up a portion of the sheet of metal 8, the end of the baking-pan opposite the transverse flange 11 being left without any transverse flange, so that the loaves of bread may be readily removed from the pan by sliding them lengthwise thereof, as hereinafter described. A portion 13 13 of the side flanges 9 9 is bent at right angles and riveted to the transverse flange 11, as shown in Fig. 5, in order to strengthen the pan. To make the transverse flange 11 practically flush or in one vertical plane, the surplus material 14, from which the separating-partition is formed in the sheet of metal 8, is flattened out, overlapped, and riveted together in the portion of the sheet forming the transverse flange, as illustrated in Figs. 4 and 5. In order to still further strengthen the pan and cover the sharp upper edge of the transverse flange 11, a reinforcing-strip 12 is folded over the top of said flange and riveted thereto.

I prefer to form my improved baking-pan with two longitudinal separating-partitions, as shown in the drawings. The loaves of bread are indicated in dotted lines in Figs. 1, 2, and 3, each loaf being separated from the one adjacent thereto by one of the convex separating-partitions 10 10. After the loaves have been baked the pan is withdrawn from the oven, and the baker, holding the pan by the end upon which the transverse flange 11 is formed, slides the three loaves of bread off the pan without touching them by tipping said pan at the necessary angle, the loaves sliding off the pan at the open end thereof. The longitudinal separating-partition, it will be seen, prevents the loaves from touching each other, and the open end of the baking-pan renders it easy to slide the loaves therefrom without breaking or injuring them. The hollow convex separating-partitions present a single thickness of metal to the loaf, as well as the bottom of the pan and the side flanges, so that a like temperature of heated metal comes in contact with the loaves at both sides and at the bottom thereof. While I have shown the separating-partitions as hollow and convex—the form which I prefer—it is evident that the two opposite sides of the partition might be formed in such a manner as to touch each other, or the partition might be formed of a single thickness of metal fastened to the sheet of metal 8, forming the pan, without departing from the spirit of my invention.

Having thus described my invention, what I claim, and desire to secure by Letters Patent, is—

As an article of manufacture, a baking-pan formed of a single sheet of metal, provided with two vertical flanges extending longitudinally thereof, a separating-partition, located between and parallel to said side flanges, extending the entire length of said pan, and a vertical transverse flange extending across one end only of said pan and integral with said sheet of metal.

In testimony whereof I have hereunto set my hand in presence of two subscribing witnesses.

JACOB KARL ZEININGER.

Witnesses:
CHARLES S. GOODING,
ANNIE J. DAILEY.